(12) United States Patent
Cho et al.

(10) Patent No.: US 7,518,695 B2
(45) Date of Patent: Apr. 14, 2009

(54) LIQUID CRYSTAL DISPLAY DEVICE, METHOD FOR MANUFACTURING THE SAME AND SPACER STRUCTURE

(75) Inventors: Suk Ho Cho, Suwon-Si (KR); Je Pil Yun, Seoul (KR)

(73) Assignee: LG Display Co., Ltd., Seoul (KR)

( * ) Notice: Subject to any disclaimer, the term of this patent is extended or adjusted under 35 U.S.C. 154(b) by 333 days.

(21) Appl. No.: 11/477,520

(22) Filed: Jun. 30, 2006

(65) Prior Publication Data

US 2007/0070286 A1    Mar. 29, 2007

(30) Foreign Application Priority Data

Sep. 28, 2005   (KR)   ...................... 10-2005-0090657

(51) Int. Cl.
*G02F 1/1339* (2006.01)
(52) U.S. Cl. .................. 349/155; 349/156; 349/157
(58) Field of Classification Search ................ 349/110, 349/125, 129, 139, 155, 156, 157
See application file for complete search history.

(56) References Cited

U.S. PATENT DOCUMENTS

| | | | | |
|---|---|---|---|---|
| 6,157,431 A * | 12/2000 | Ooue et al. | ................. | 349/155 |
| 6,411,360 B1 * | 6/2002 | Matsuyama et al. | ......... | 349/156 |
| 7,133,108 B2 * | 11/2006 | Shimizu et al. | ............. | 349/155 |
| 2005/0088606 A1 * | 4/2005 | Ashizawa et al. | ............ | 349/156 |
| 2005/0243263 A1 * | 11/2005 | Yoon | ........................... | 349/156 |
| 2006/0290860 A1 * | 12/2006 | Lee | .............................. | 349/139 |
| 2007/0002237 A1 * | 1/2007 | Yoon | ........................... | 349/129 |
| 2007/0132936 A1 * | 6/2007 | Lee et al. | ..................... | 349/156 |
| 2007/0139604 A1 * | 6/2007 | Paik et al. | .................... | 349/156 |

FOREIGN PATENT DOCUMENTS

| CN | 1661425 A | 8/2005 |
|---|---|---|
| GB | 2 411 485 A | 8/2005 |
| JP | 3-197928 A | 8/1991 |

* cited by examiner

*Primary Examiner*—Hemang Sanghavi
(74) *Attorney, Agent, or Firm*—Birch, Stewart, Kolasch & Birch, LLP

(57) ABSTRACT

A liquid crystal display device includes a first substrate and a second substrate arranged to face each other; at least one protrusion formed on the first substrate at a first region, the at lest one protrusion having a recess therein; a first column spacer formed on the second substrate corresponding to the at least one protrusion; and a liquid crystal layer filled between the first and second substrates.

39 Claims, 12 Drawing Sheets

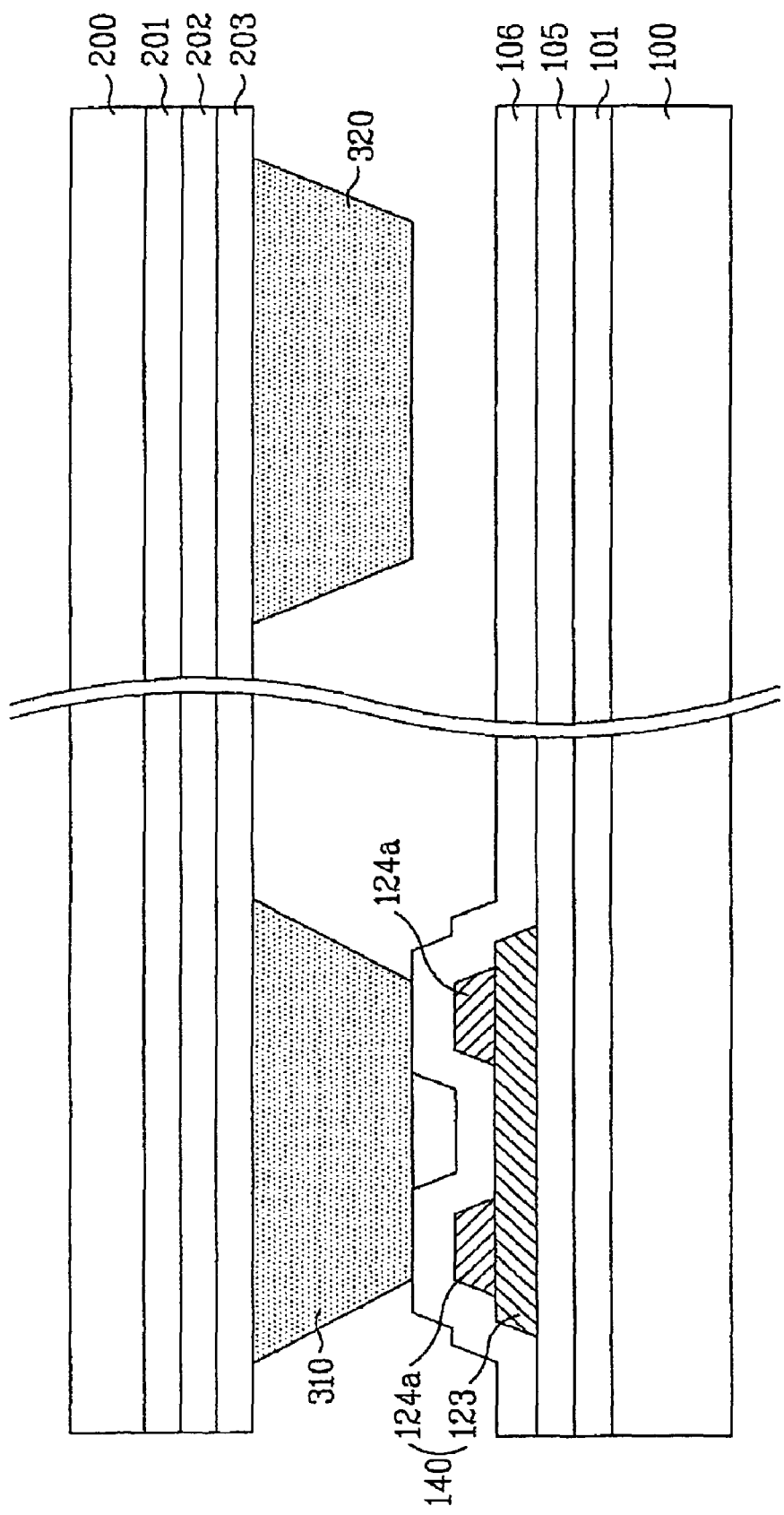

LIQUID CRYSTAL DISPLAY DEVICE, METHOD FOR MANUFACTURING THE SAME AND SPACER STRUCTURE

This Nonprovisional Application claims priority under 35 U.S.C. §119(a) on Patent Application No. 10-2005-0090657 filed in Korea on Sep. 28, 2005, the entire contents of which are hereby incorporated by reference.

BACKGROUND OF THE INVENTION

1. Field of the Invention

The present invention relates to a liquid crystal display device, and more particularly, to a liquid crystal display device, which is capable of preventing a touch defect and gravity defect and has a stable structure resistant to a push test, and a method for manufacturing the same.

2. Discussion of the Related Art

The development of information-dependent society creates a strong demand for various types of display devices. To fulfill the demand, efforts have recently been made to research flat panel display devices, such as liquid crystal display (LCD) devices, plasma display panel (PDP) devices, electro-luminescent display (ELD) devices, and vacuum fluorescent display (VFD) devices. Some types of such flat panel display devices are being practically applied to various appliances for display purposes.

Among the above mentioned display devices, in particular, LCD devices have been used as a substitute for cathode ray tube (CRT) devices because of its outstanding characteristics and advantages, for example, superior picture quality, lightness, thinness, and low energy consumption. Thus, LCD devices are currently most widely used. Various applications of LCD devices are being developed in association with not only mobile image display devices such as monitors of notebook computers, but also monitors of television sets to receive and display broadcast signals, and monitors of laptop computers.

Successful application of such LCD devices to diverse image display devices depends on whether or not the LCD devices can realize desired high picture quality including high resolution, high brightness, large display area, and the like, while maintaining desired characteristics of lightness, thinness, and low power consumption.

A general LCD device includes first and second substrates that are bonded to each other with a certain space therebetween, and a liquid crystal layer formed between the first and second substrates.

More specifically, the first substrate includes a plurality of gate lines that are arranged in one direction while being uniformly spaced apart from one another, and a plurality of data lines that are arranged in a direction perpendicular to the gate lines while being uniformly spaced apart from one another. The gate lines and data lines define pixel regions. The first substrate further includes pixel electrodes arranged at the respective pixel regions, and thin film transistors respectively formed at intersections of both the gate lines and data lines. The thin film transistors serve to apply data signals of the data lines to each pixel electrode in response to signals applied to the gate lines.

The second substrate includes a black matrix layer for blocking incidence of light to regions other than the pixel regions, R, G, and B color filter layers respectively formed at regions corresponding to the pixel regions and adapted to express color tones, and a common electrode formed on the color filter layer and adapted to reproduce an image.

In the LCD device having the above described configuration, liquid crystals of the liquid crystal layer that is formed between the first and second substrates are oriented by an electric field between the pixel electrodes and the common electrode. The quantity of light passing through the liquid crystal layer is regulated based on the orientation degree of the liquid crystal layer, to display an image.

The LCD device described above is called a "twisted nematic (TN) mode LCD device". The TN mode LCD device has a drawback of a narrow viewing angle, and therefore, an in-plane switching (IPS) mode LCD device has been developed to overcome the drawback of the TN mode LCD device.

In the IPS mode LCD device, a pixel electrode and a common electrode are formed on a first substrate at each pixel region of the first substrate such that the pixel electrode and common electrode extend parallel to each other while being spaced apart from each other to generate an in-plane electric field (horizontal electric field), thereby allowing liquid crystals of a liquid crystal layer to be aligned with the in-plane electric field.

Meanwhile, spacers are provided between first and second substrates of the LCD device having the above described configuration, to maintain a predetermined gap for the liquid crystal layer.

The spacers are classified into ball spacers and column spacers based on their shapes.

The ball spacers have a spherical shape, and are scattered on the first and second substrates. Even after the first and second substrates are completely bonded to each other, the ball spacers are relatively free in movement, and have a small contact area with respect to the first and second substrates.

The column spacers are formed during an array process of the first or second substrate. The column spacers are fixedly mounted on a selected one of the substrates, and have a circular cylinder shape with a certain height. Accordingly, the column spacers have a relatively large contact area with respect to the first and second substrates as compared to the ball spacers.

Hereinafter, a conventional LCD device having column spacers will be explained with reference to the accompanying drawing.

FIG. 1 is a sectional view showing the conventional LCD device having column spacers.

As shown in FIG. 1, the LCD device having column spacers includes: first and second substrates 30 and 40 arranged to face each other; at least one column spacer 20 formed between the first and second substrates 30 and 40; and a liquid crystal layer (not shown) filled between the first and second substrates 30 and 40.

The first substrate 30 includes: a plurality of gate lines 31 and data lines (not shown), which are arranged perpendicular to each other and adapted to define pixel regions; thin film transistors (TFT) formed at intersections of the gate lines and data lines; and pixel electrodes (not shown) arranged at the respective pixel regions.

The second substrate 40 includes: a black matrix layer 41 formed at regions other than the pixel regions; color filter layers 42 having a stripe pattern and formed corresponding to the pixel regions that belong to vertical lines parallel to the data lines; and a common electrode or overcoat layer 43 formed over the entire surface of the second substrate 40.

The column spacer 20 is formed corresponding to a certain position on a top of the relevant gate line 31.

Additionally, the first substrate 30 further includes: a gate insulation layer 36 formed over the entire surface of the first substrate 30 including the gate lines 31; and a protective layer 37 formed over the gate insulation layer 36.

FIGS. 2A and 2B are a plan view and a sectional view, showing a touch defect of the LCD device having the column spacer.

As shown in FIGS. 2A and 2B, in the case of the LCD device having the column spacer as stated above, when a surface of a liquid crystal panel 10 is continuously touched with a finger or object along a certain direction, a spot is generated at the touched portion. The spot may be called a "touch spot" because it is generated by a touch action, or may be called a "touch defect" because it is observed on a screen.

The reason to cause the touch defect in the LCD device having the column spacer is that the column spacer 20 has a large contact area with a first substrate 1 as compared to ball spacers. Therefore, it suffers from a larger frictional force to cause the touch defect. More specifically, as shown in FIG. 2B, since the column spacer 20 has a larger contact area with the first substrate 1 than ball spacers, a large frictional force caused by the larger contact area prevents the rapid restoration to the original state when the first and second substrates 1 and 2 are shifted relative to each other by a touch action. This results in the long-lasting spots.

FIG. 3 is a sectional view showing a gravity defect of the LCD device.

As shown in FIG. 3, if the LCD device, in which the liquid crystals 3 are filled between the first and second substrates 1 and 2 and the column spacer 20 is formed between the first and second substrates at a predetermined position, is placed in a vertical direction for an extended period of time while being maintained at a high temperature, the liquid crystals expand due to the high temperature, thereby causing a cell gap extending beyond a height of the column spacer 20. As a result, gravity causes the liquid crystals to move to a lower portion of the LCD device, creating a swollen portion at the lower portion. This swollen portion is called a "gravity defect".

The conventional LCD device having the column spacer as stated above has the following problems.

First, a contact area between the column spacer and the substrate is excessively large. Accordingly, when the substrate is shifted by a touch action, the large contact area causes a large frictional force, thereby preventing the rapid restoration to the original state, and resulting in long-lasting touch defects.

Second, if a liquid crystal panel having the column spacer is placed in a vertical direction for an extended period of time at a high temperature, the liquid crystals expand due to the high temperature, causing a cell gap extending beyond the height of the column spacer. As a result, gravity causes the liquid crystals to move to a lower portion of the liquid crystal panel, creating a swollen portion at the lower portion. The swollen portion is observed as an opaque portion.

Third, when the LCD device is subjected to a push test for the inspection of durability prior to shipping, a predetermined pressure is applied to a certain region of the LCD device. In this case, if the column spacer is insufficient to maintain a cell gap between upper and lower substrates, the column spacer may be crushed, resulting in what is known as a "imprinting spot" at the position of the column spacer.

SUMMARY OF THE INVENTION

Accordingly, the present invention is directed to an LCD device and a method for manufacturing the same that substantially obviate one or more problems due to limitations and disadvantages of the related art.

An object of the present invention is to provide a liquid crystal display device, which is capable of preventing a touch defect and a gravity defect and has a stable structure resistant to a push test, and a method for manufacturing the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: a first substrate and a second substrate arranged to face each other; at least one protrusion formed on the first substrate at a first region, the at lest one protrusion having a recess therein; a first column spacer formed on the second substrate corresponding to the at least one protrusion; and a liquid crystal layer filled between the first and second substrates.

In another aspect of the present invention, there is provided a method for manufacturing a liquid crystal display device comprising the steps of: preparing a first substrate and a second substrate facing each other; forming at lest one protrusion on the first substrate at a first region, the at lest one protrusion having a recess therein; forming a first column spacer on the second substrate corresponding to the at least one protrusion; providing liquid crystal materials between the first and second substrates; and bonding the first and second substrates to each other.

In another aspect of the present invention, there is provided a spacer of a display device. The display device has a first substrate and a second substrate facing each other. The spacer structure comprising: at least one protrusion formed on the first substrate at a first region, the at lest one protrusion having a recess therein; and a first column spacer formed on the second substrate corresponding to the at least one protrusion.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a sectional view showing first and second column spacers of the liquid crystal display device in accordance with the second embodiment of the present invention.

DETAILED DESCRIPTION OF THE ILLUSTRATED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Now, a liquid crystal display device and a method for manufacturing the same will be explained in detail with reference to the accompanying drawings.

Figure 1:
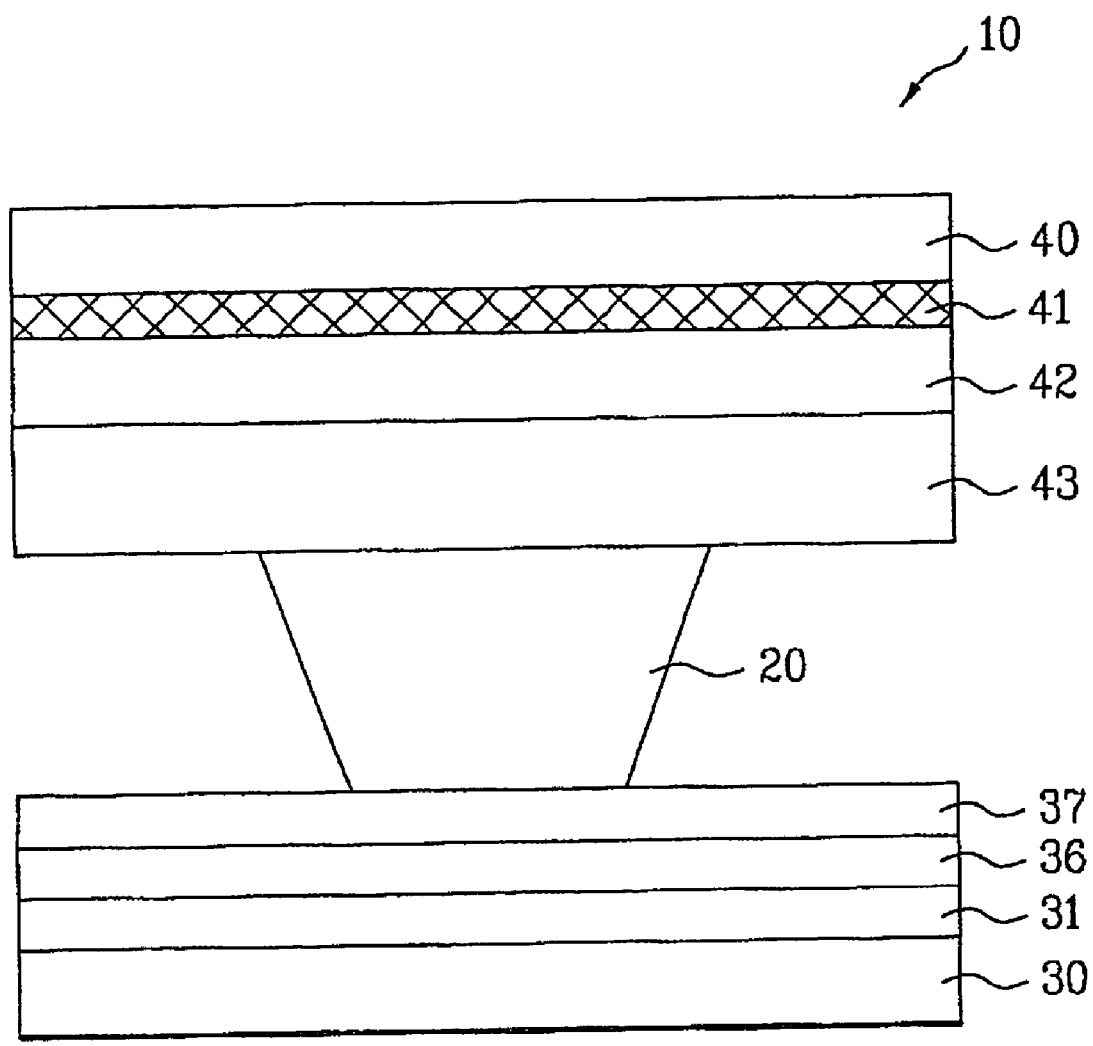
FIG. 1 is a sectional view showing a general liquid crystal display device including a column spacer.
Figure 2A:
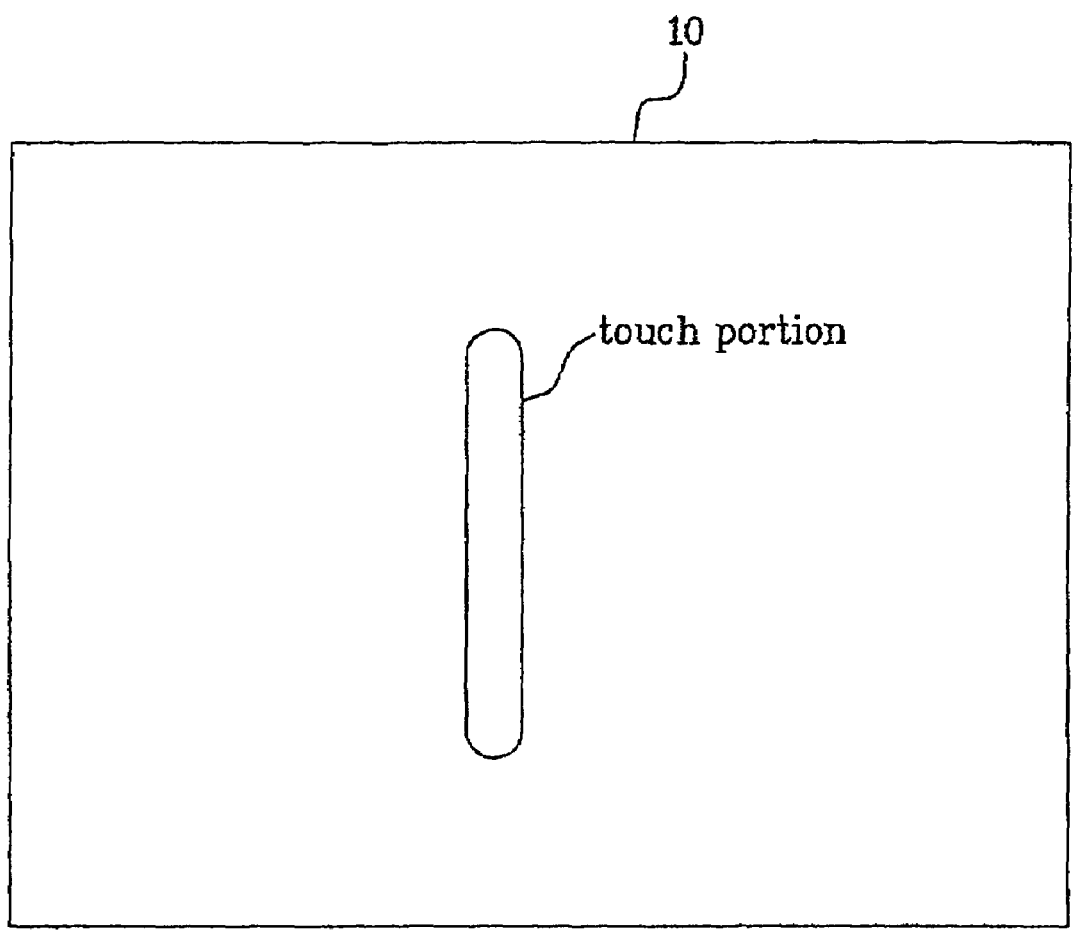
FIGS. 2A and 2B are a plan view and a sectional view, respectively, showing a touch defect of the liquid crystal display device including the column spacer.
Figure 2B:
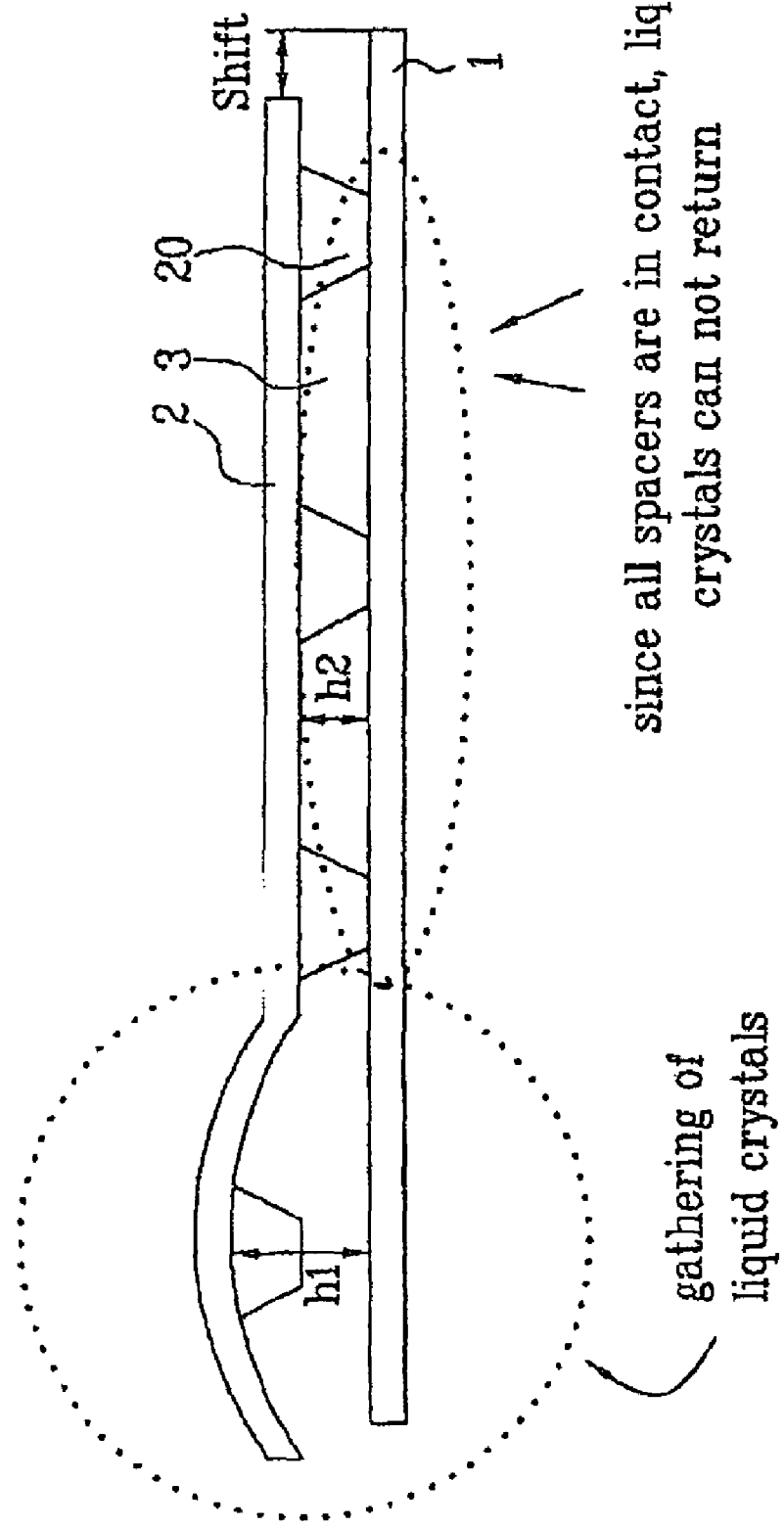
Figure 3:
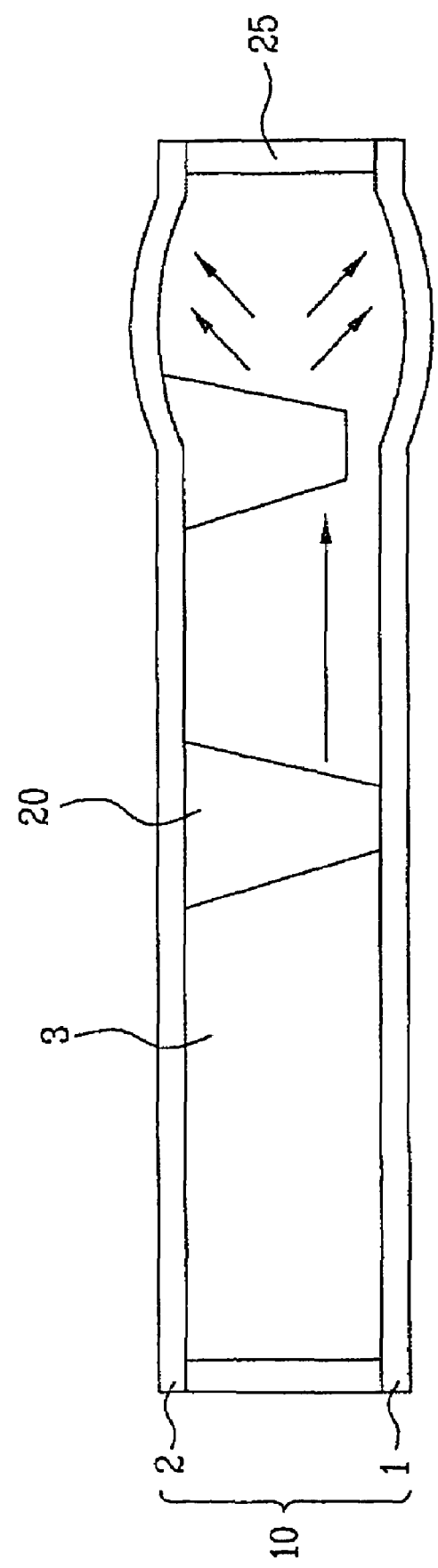
FIG. 3 is a sectional view showing a gravity defect of the liquid crystal display device.
Figure 4:
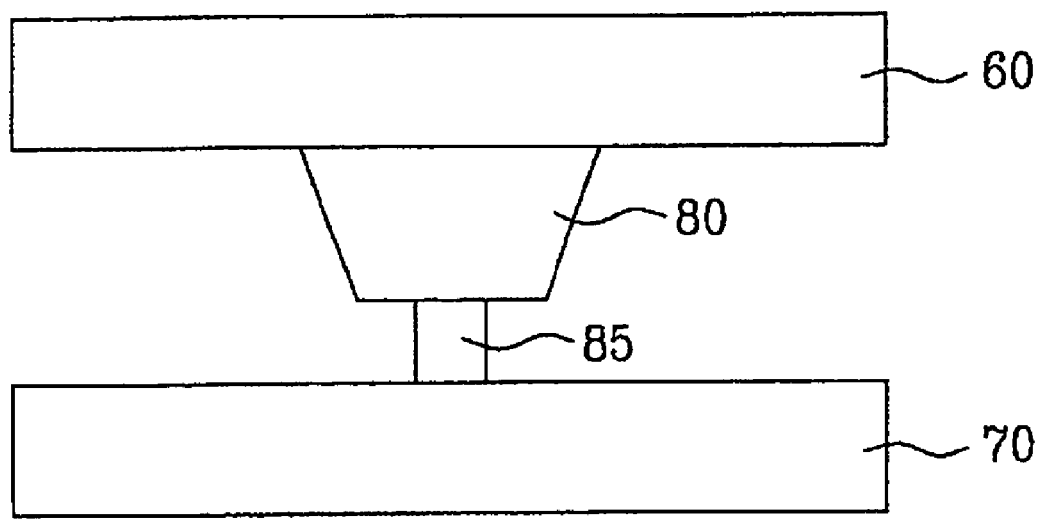
FIG. 4 is a plan view showing a protrusion included in a liquid crystal display device in accordance with an embodiment of the present invention.

FIG. 4 is a plan view showing the configuration of a protrusion included in the liquid crystal display device in accordance with an embodiment of the present invention.

As shown in FIG. 4, the liquid crystal display device using a protrusion according to an embodiment of the present invention includes: first and second substrates 60 and 70 arranged to face each other; at least one column spacer 80 formed on the first substrate 60 at a predetermined position of the first substrate 60; a protrusion 85 formed on the second substrate 70 to come into partial contact with the column spacer 80, the protrusion 85 having a smaller volume than the column spacer 80; and a liquid crystal layer (not shown) filled between the first and second substrates 60 and 70.

In this embodiment, when a surface of the first substrate 60 or second substrate 70 is continuously touched by a finger (i.e. is temporarily or continuously rubbed by a finger along a certain direction), the first and second substrates 60 and 70 are shifted relative to each other. The protrusion 85 serves to reduce a frictional force between the column spacer 80 and the second substrate 70. More specifically, since the protrusion 85 has a smaller area than the column spacer 80, the contact area is significantly reduced from the larger bottom surface of the column spacer 80 to the smaller area of the protrusion 85, resulting in a reduced frictional area. As a result, a frictional force between the column spacer 80 and the second substrate 70 is reduced when the first and second substrates 60 and 70 are shifted relative to each other by a touch action. This allows rapid restoration to the original state.

In the above described configuration including the protrusion 85, if a predetermined pressure force is applied to the first and second substrates 60 and 70, the force concentrates at a portion of the column spacer 80 corresponding to the protrusion 85. As a result, along with the portion of the column spacer 80 corresponding to the protrusion 85, an overcoat layer (not shown), color filter layers (not shown), and black matrix layer (not shown), laminated below the column spacer 80 in this sequence, are pressed together, causing the portion of the column spacer 80 corresponding to the protrusion 85 to be depressed relative to the remaining portion of the column spacer 80.

Accordingly, when the liquid crystal display device, more particularly, a liquid crystal panel is maintained at a high temperature, and thus, a cell gap is extended due to the thermal expansion of liquid crystals, the column spacer 80 and the pressed single or plural layers below the column spacer 80 can stably maintain a desired cell gap between the first and second substrates 60 and 70 as they restore their original state so long as they are not excessively pressed. This can prevent a gravity defect caused by falling of liquid crystals.

However, when the protrusion 85 is formed at the center of the column spacer 80 to come into contact with the column spacer 80, due to the fact that the protrusion 85 has a surface area smaller than that of the column spacer 80 and the column spacer 80 is made of an elastic material softer than that of the protrusion 85, the column spacer 80 may be excessively pressed by the protrusion 85 at the contact portion thereof.

To further enhance the prevent invention, the followings embodiments of the liquid crystal display device, which are capable of preventing not only a touch defect and a gravity defect, but also plastic deformation of the column spacer and layers arranged below the column spacer through the use of a protrusion, will be explained with reference to the accompanying drawings.

FIRST EMBODIMENT

Figure 5:
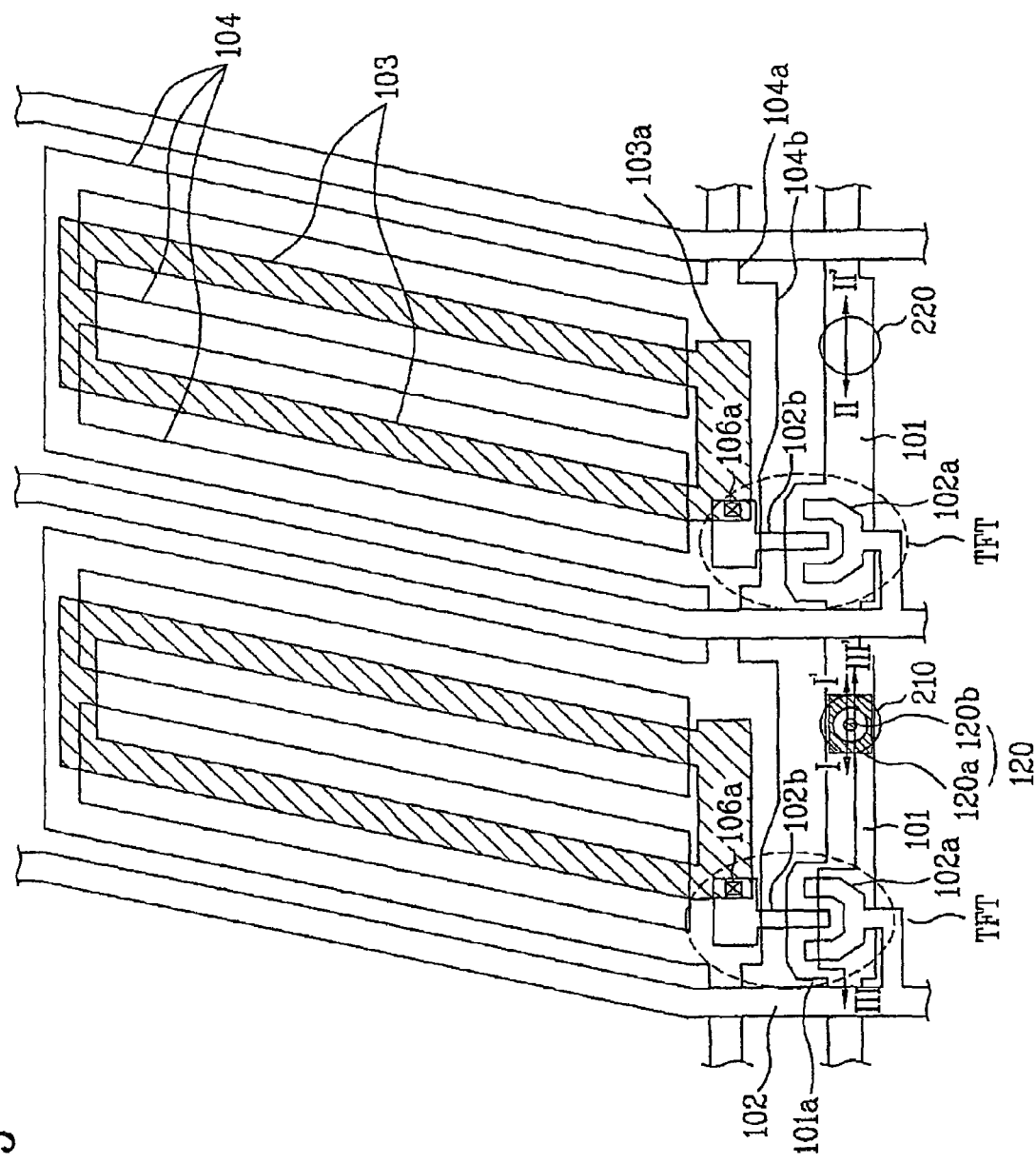
FIG. 5 is a plan view showing a liquid crystal display device in accordance with a first embodiment of the present invention.
Figure 6:
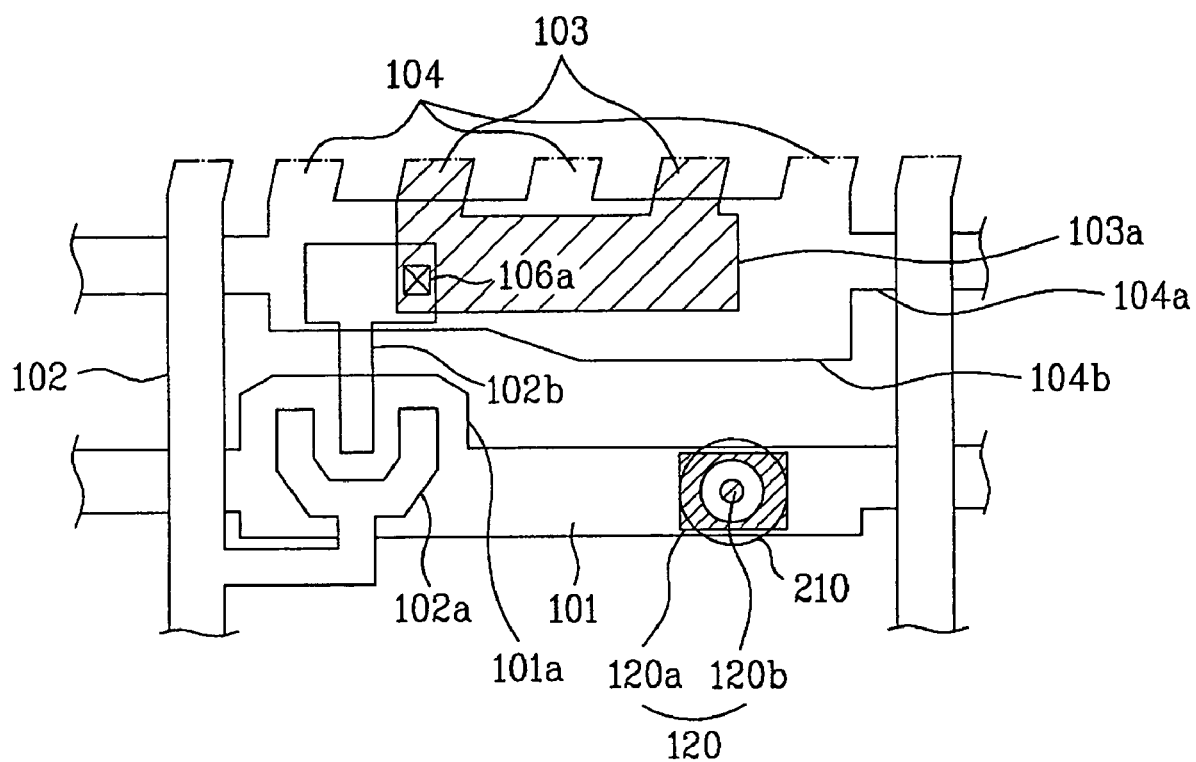
FIG. 6 is an enlarged plan view showing a first column spacer of FIG. 5 and a peripheral region thereof.
Figure 7:
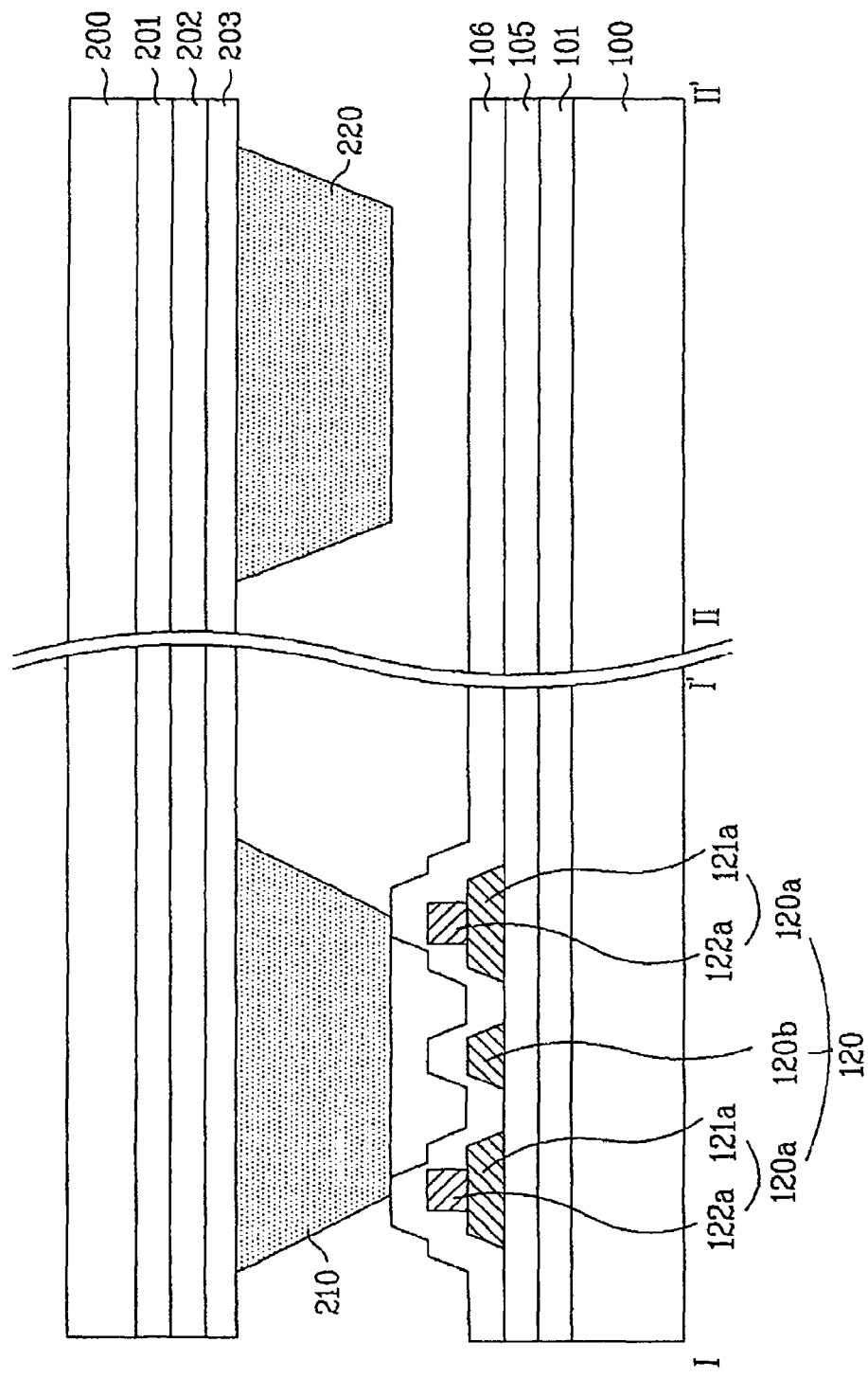
FIG. 7 is a sectional view showing first and second column spacers of FIG. 5.

FIG. 5 is a plan view showing a liquid crystal display device in accordance with a first embodiment of the present invention. FIG. 6 is an enlarged plan view showing a first column spacer of FIG. 5 and a peripheral region thereof. FIG. 7 is a sectional view showing first and second column spacers of FIG. 5.

As shown in FIGS. 5 to 7, the liquid crystal display device in accordance with the first embodiment of the present invention includes: a first substrate 100 and a second substrate 200 that are arranged to face each other; and a liquid crystal layer (not shown) filled between the first and second substrates 100 and 200.

The first substrate 100 includes: a plurality of gate lines 101 and data lines 102 that intersect each other and adapted to define pixel regions; thin film transistors (TFT) formed at intersections of the gate lines and data lines; first storage electrodes 103a electrically connected to drain electrodes 102b of the TFTs, respectively; pixel electrodes 103 branched from the respective first storage electrodes 103a; common electrodes 104 branched from respective second storage electrodes, so as to be arranged alternately with the pixel electrodes 103; common lines 104a extending parallel to the gate lines 101; and the second storage electrodes 104b connected to the common lines 104a and the common electrodes 104 to be overlapped with the respective first storage electrodes 103a.

Each of the TFTs includes: a source electrode 102a; the drain electrode 102b; and a channel region defined between the source and drain electrodes 102a and 102b. The source electrode 102a has a U-shaped inner contour, and accordingly, the channel region has a U-shaped form. The TFT further includes a gate electrode 101a protruding from one of the gate lines 101. The U-shaped source electrode 102a protrudes from one of the data lines 102, and the drain electrode 102b extends into the U-shaped source electrode 102a while being spaced apart from the source electrode 102a by a predetermined distance. The TFT further includes a semiconductor layer (not shown in FIGS. 5 and 6;= see reference numeral 107a of FIG. 10E), which is formed below the data line 102, source electrode 102a, and drain electrode 102b, and below the channel region between the source and drain electrodes 102a and 102b. Here, the semiconductor layer has a laminated structure including an amorphous silicon layer (not shown) and an n+ layer (impurity layer) (not shown) formed on the amorphous silicon layer. The n+ layer (impurity layer) is removed from a portion of the semiconductor layer corresponding to the channel region between the source and drain electrodes 102a and 102b. The semiconductor layer may be selectively formed below the source/drain electrodes 102a and 102b and below the channel region between the source/drain electrodes 102a and 102b, or may be formed below the data line 102, source electrode 102a, and drain electrode 102b other than the channel region. Meanwhile, although the liquid crystal display device in this illustrated embodiment has the U-shaped source electrode 102a and U-shaped channel region, it will be appreciated that the present invention is applicable even when the source electrode 102a has a linear or any other shape.

Here, the gate lines 101, common lines 104a, and common electrodes 104 are made of the same metal as each other to form the same layer.

A gate insulation layer 105 is interposed between the gate lines 101 and the semiconductor layer, and a protective layer 106 is interposed between the data lines 102 and the pixel electrodes 103.

Meanwhile, each second storage electrode 104b connected to one of the common lines 104a that pass through the pixel regions, the first storage electrode 103a formed on the second storage electrode 104b, and the gate insulation layer 105 and protective layer 106 interposed between the two electrodes constitute a storage capacitor.

Here, the drain electrodes 102b are formed at a different layer from that of the storage electrodes 103a, such that they come into contact with each other through contact holes 106a. The contact holes 106a are formed by removing predetermined portions of the protective layer 106 above the respective drain electrodes 102b.

A plurality of protrusions 120 are formed at predetermined positions above the gate lines 101. Each of the protrusions 120 has a laminated structure including a semiconductor layer pattern 121a and a source/drain metal layer pattern 122a formed on the semiconductor layer pattern 121a. The protrusion 120 is configured such that a closed loop shaped recess is formed in a first pattern 120a having a rectangular horizontal cross section as shown in FIG. 6. The closed loop may have a circular, polygonal or other shapes. Additionally, a circular or polygonal second pattern 120b, which is smaller than the closed loop shaped recess, is formed inside the recess. Although the circular closed loop shaped recess and the circular second pattern 120b are shown in FIGS. 5 and 6, the present invention is not limited thereto. Polygonal or other shapes may be also adopted.

As shown in FIG. 7, when viewed in the vertical cross section of the protrusion 120, it is observed that the first pattern 120a includes the semiconductor layer pattern 121a and the source/drain metal layer pattern 122a, and the second pattern 120b includes the semiconductor layer (which is in the same layer as the semiconductor layer pattern 121a). The first pattern 120a is spaced apart from the second pattern 120b by a predetermined distance. When viewed in the horizontal cross section (i.e., the top view) of the protrusion 120 as shown in FIGS. 5 and 6, the first pattern 120a forms the rectangular boundary of the protrusion 120, and the second pattern 120b is formed at the center of the rectangular first pattern 120a. As will be understood from the drawings, the protrusion 120, including the first and second patterns 120a and 120b, has a gap between the first and second patterns 120a and 120b.

The semiconductor layer pattern 121a has a thickness of approximately 0.2 to 0.3 μm, and the source/drain metal layer pattern 122a has a thickness of approximately 0.2 to 0.4 μm. As compared to the remaining region of the gate lines 101 where the protrusions 120 are not formed and the recessed region in the respective protrusions 120, the first pattern 120a is raised by a height of approximately 0.4 to 0.7 μm, and the second pattern 120b is raised by a height of approximately 0.2 to 0.4 μm. Accordingly, the first and second patterns 120a and 120b have a height difference equal to the thickness of the source/drain metal layer pattern 122a. With the height difference between the first and second patterns 120a and 120b, as shown in FIG. 7, a space having a W-shaped vertical cross section is formed between the protrusion 120 and a first column spacer 210 corresponding to the protrusion 120 after the first and second substrates 100 and 200 are bonded to each other.

The protective layer 106 is formed over the protrusion 120 except for the contact hole 106a. Accordingly, the protective layer 106 on the protrusion 120 may be a portion that actually comes into contact with the first column spacer 210 that is formed on the second substrate 200. However, in another embodiment, the protective layer 106 does not cover the protrusion 120, and therefore the first column spacer 210 is in contact with the protrusion 120.

Meanwhile, the second substrate 200, arranged to face the first substrate 100, includes: a black matrix layer 201 formed at the regions (corresponding to the gate lines and data lines) other than the pixel regions; color filter layers 202 formed on the second substrate 200 including the black matrix layer 201; and an overcoat layer 203 formed on the second substrate 200 including the black matrix layer 201 and color filter layers 202. The overcoat layer 203 is for use in a later flattening process.

The overcoat layer 203 is formed with the first column spacers 210 at positions corresponding to the respective protrusions 120. In addition, the overcoat layer 203 is formed with second column spacers 220 at positions corresponding to the regions of the gate lines 101 where the protrusions 120 are not formed. Although in the illustrated embodiments both the first and second column spacers 210 and 220 are formed on the overcoat layer 203, the present invention is not limited to these embodiment with both the first and second column spacers 210 and 220. For example, simply using the first spacer 210 and the corresponding protrusion 120 would also fall within the scope of the present invention.

In the illustrated embodiment, the first and second column spacers 210 and 220 are formed on the overcoat layer 203 to have the same height as each other. However, the first and second column spacers 210 and 220 can also have same heights. When the first and second substrates 100 and 200 are bonded to each other, as shown in FIG. 7, each of the first column spacers 210 comes into contact with the protective layer 106 at a portion of the protective layer 106 above the first pattern 120a. In this case, a portion of the protective layer 106 above the second pattern 120b is spaced apart from the first column spacer 210. In a state wherein the first and second substrates 100 and 200 are bonded to each other, each of the second column spacers 220 is spaced apart from the protective layer 106 formed on the first substrate 100 by a distance of approximately 0.4 to 0.7 μm when viewed in a vertical cross section. With this configuration, when a surface of the bonded first or second substrate 100 is continuously touched by a finger along a certain direction, an actual contact area between the first and second substrates 100 and 200 is restricted to a partial portion of the overall surface area of the first pattern 120a of the protrusion 120. As a result, only a very small frictional force is generated when the substrates are shifted to each other by the touch action. Therefore, it allows rapid restoration to the original state, and prevents generation of touch spots.

When a push test for applying a predetermined pressure to the bonded first and second substrates 100 and 200 is performed, the first column spacer 210 having elasticity is pushed by the corresponding protrusion 120. Specifically, the first column spacers 210 is initially deformed from a portion thereof corresponding to the first pattern 120a in contact with the first column spacer 210, and is finally deformed at a central portion thereof corresponding to the second pattern 120b in accordance with an increase in the pressure applied to the substrates 100 and 200.

The above described configuration of the protrusion and column spacer of the liquid crystal display device can distribute the pressure of the push test onto the first and second patterns 120a and 120b, differently from the conventional configuration wherein a protrusion simply corresponds to the center of a column spacer. This increases a contact area between the protrusion 120 and the first column spacer 210 in proportional to the pressure, thereby alleviating excessive plastic deformation of the first column spacer 210 at the contact portion thereof and maintaining a cell gap between the first and second substrates 100 and 200 during the push test.

More specifically, when the liquid crystal display device is touched after bonding of the first and second substrates 100 and 200, only the top of the first pattern 120a of the protrusion 120 comes into contact with the first column spacer 210, and the remaining portion of the protrusion 120 is spaced apart from the first column spacer 210. This results in a small contact area between the first and second substrates 100 and 200 to significantly reduce the risk a touch defect.

Also, if the illustrated liquid crystal display device is subjected to a push test wherein a predetermined pressure (beyond a pressure required for bonding two substrates) is applied to the bonded substrates, the contact area between the protrusion 120 and the first column spacer 210 gradually increases. Therefore, as the applied pressure increases, the pressure can be distributed over the surface area of the first column spacer 210 corresponding to the protrusion 120, rather than being concentrated on a specific portion of the first column spacer 210. This prevents excessive deformation of the first column spacer 210 at the specific location thereof. If the pressure increases further, the second column spacer 220 as well as a portion location of the first column spacer 210 corresponding to the closed loop shaped recess of the protrusion 120 come into contact with the protective layer 106 formed on the first substrate 100. Therefore, the contact area increases greatly to effective prevent the undesired or excessive deformation of the first and second column spacers 210 and 220.

The first column spacer 210 functions as a gap maintenance spacer for maintaining a cell gap between the first and second substrates 100 and 200. The second column spacer 220 functions as a depression prevention spacer for attenuating the deformation of the column spacer when it is pushed. In addition, the protrusion 120 functions as an auxiliary depression prevention spacer due to the closed loop shaped recess or second pattern 120b thereof.

Once the first and second substrates 100 and 200 are bonded to each other, the first pattern 120a, which forms the boundary of the protrusion 120, comes into contact with the first column spacer 210. Therefore, the first column spacer 210 is depressed by a certain thickness upon receiving the pressure applied during the bonding process. As a result, a stress is concentrated at the contact region between the first pattern 120a and the first column spacer 210. However, since the first column spacer 210 has an elastic restoration force at the stress concentrated portion when liquid crystals are expanded at a high temperature, it can stably maintain a cell gap between the first and second substrates 100 and 200 to some extent. Specifically, when the liquid crystals are expanded due to a high temperature, the first column spacer 210 elastically overcome a depression force applied thereto by the first pattern 120a of the protrusion 120, thereby achieving a supporting force required to maintain the cell gap. Accordingly, the first column spacer provides a desired supporting force even if the liquid crystals are expanded due to a high temperature, thereby preventing a gravity defect.

Meanwhile, it will be appreciated that positions of the first and second column spacers 210 and 220 are not limited to the gate lines 101, and may be formed on the common lines 104a that are the same metal layer as the gate lines 101. In this embodiment, each protrusion 120 is positioned to correspond to the relevant first column spacer 210. For example, when the first column spacers 210 are formed above the gate lines 101, as shown, the protrusions 120 may be formed on the gate lines 101 to correspond to the first column spacers 210. Also, when the first column spacers 210 are formed above the common lines 104a, the protrusions 120 may be formed on the common lines 104a.

As stated above, the first and second column spacers 210 and 220 can be formed above the gate lines 101 or common lines 104a. Starting from below the first and second column spacers 210 and 220, the overcoat layer 203 is laminated on the color filter layer 202, the color filter layer 202 is laminated on the black matrix layer 201, and finally, the black matrix layer 201 is laminated on the second substrate 200.

The protrusions 120 are formed as the thin film transistors, more particularly, the semiconductor layer (designated as reference numeral 107a of FIG. 10E) and data line layer including the data lines 102 and source/drain electrodes 102a and 102b, are patterned by use of a half-torn mask or diffraction exposure mask.

SECOND EMBODIMENT

Figure 8:
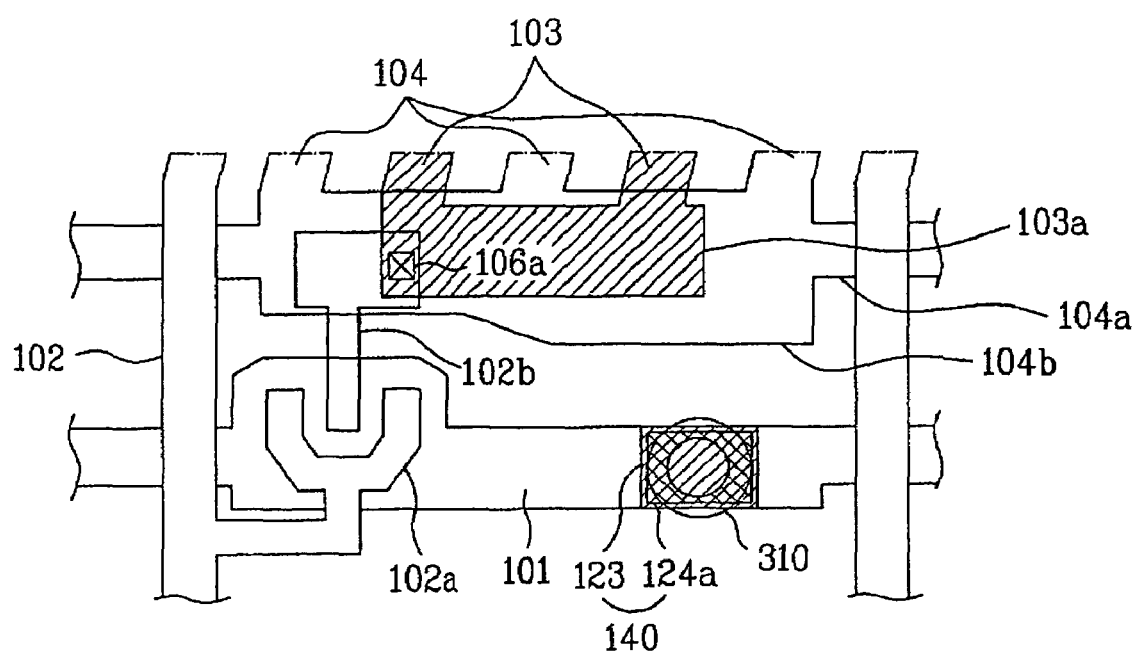
FIG. 8 is an enlarged plan view showing a first column spacer and a peripheral region thereof included in a liquid crystal display device in accordance with a second embodiment of the present invention.

FIG. 8 is an enlarged plan view showing a first column spacer and a peripheral region thereof included in a liquid crystal display device in accordance with a second embodiment of the present invention. FIG. 9 is a sectional view showing first and second column spacers of the liquid crystal display device in accordance with the second embodiment of the present invention.

As shown in FIGS. 8 and 9, the liquid crystal display device in accordance with the second embodiment of the present invention is basically similar to that of the previously described first embodiment as shown in FIGS. 5 to 7 except for the shape of a protrusion 140, and the detailed description of the similar configuration will be omitted.

As shown in FIG. 8, the protrusion 140 has a laminated structure including a lower semiconductor layer 123 having a rectangular horizontal cross section and an upper source/drain metal layer pattern 124a having a smaller horizontal cross section than that of the semiconductor layer 123, a central portion of the source/drain metal layer pattern 124a being circularly removed. A first column spacer 310 is formed to correspond to the protrusion 140. Both the protrusion 140 and the first column spacer 310 may be formed on the common line 104a. Also, a second column spacer 320 is formed on the overcoat layer 203 at a position corresponding to a region of the gate line 101 or common line 104a where the protrusion 140 is not formed.

As shown in FIG. 9, the protective layer 106 is formed over the entire surface of the gate insulation layer 105 and over a top of the protrusion 140. The first column spacer 310 is formed on the second substrate 200 to correspond to the protrusion 140. When the first and second substrates 100 and 200 are bonded to each other, a portion of the protective layer 106 above the source/drain metal layer pattern 124a comes into contact with the first column spacer 310. In this embodiment, a portion of the protective layer 106, which corresponds to the center of the protrusion 140 where the source/drain metal layer pattern 124a is not formed, is spaced apart from the first column spacer 310.

Similar to the first embodiment of the present invention, when a pressure, required to bond the first and second substrates 100 and 200, is applied, only a selected portion of the protrusion 140 (where the source/drain metal layer pattern 124a is formed) comes into contact with the first column spacer 310, and the remaining portion of the protrusion 140 is spaced apart from the first column spacer 310. Accordingly, as compared to the conventional column spacer having no protrusion, a contact area due to a touch action is reduced, thereby allowing rapid restoration to the original state and preventing a touch defect.

In addition, when the liquid crystal display device in accordance with the second embodiment of the present invention is subjected to a push test wherein a predetermined pressure, which is larger than a pressure applied to bond two substrates, is applied, a portion of the protective layer 106 above the source/drain metal layer pattern 124a is first pushed by the first column spacer 310. Finally, a portion of the protective layer 106, which corresponds to the semiconductor layer 123 of the protrusion 140 where the source/drain metal layer pattern 124a is not formed, is pushed by the first column spacer 310. During the push test, a contact area between the protrusion 140 and the first column spacer 310 increases in accordance with an increase in the pressure applied, resulting in distribution of the pressure. This preventing generating a imprinting spot (push spot) at the first column spacer 310 even if an excessively high pressure is applied during the push test.

When the first column spacer 310, which comes into contact with the protective layer 106 above the source/drain metal layer pattern 124a in the bonded state of the substrates, is depressed by a certain thickness at the contact portion thereof, and the liquid crystals are expanded, at a high temperature, as much as the depressed thickness of the first column spacer 310, it is possible to prevent the first substrate 100 from being spaced apart from the first column spacer 310. As a result, in a state wherein the first column spacer 310 comes into contact with a corresponding portion of the protrusion 140, falling of the liquid crystals due to gravity can be prevented, thereby avoiding a gravity defect.

Hereinafter, a method for manufacturing the liquid crystal display device in accordance with an embodiment of the present invention will be explained. In particular, the method for manufacturing the liquid crystal display device will be explained based on the first embodiment of the present invention. In the following accompanying drawings, the protrusion formed on the first substrate, and the semiconductor layer and source/drain layer formed in the same layer as the protrusion are shown.

FIGS. 10A to 10E are sectional views showing sequential processes of a method for manufacturing the first and second column spacers of the liquid crystal display device in accordance with an embodiment of the present invention(the plan view of the liquid crystal display device refers to FIGS. 5 and 6).

Figure 10A:
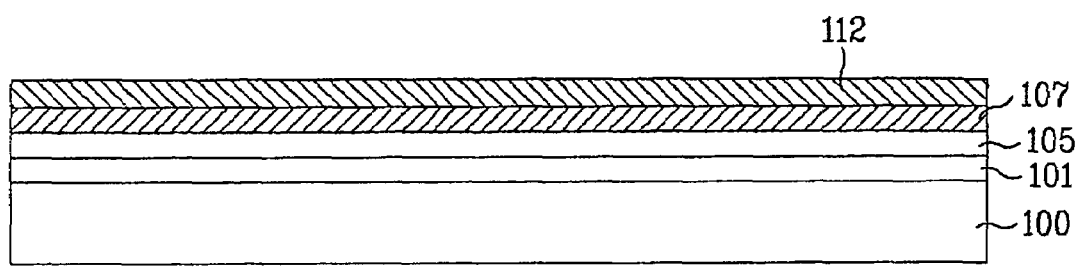
FIGS. 10A to 10E are sectional views showing sequential processes of a method for manufacturing the first and second column spacers of the liquid crystal display device in accordance with an embodiment of the present invention.

As shown in FIG. 10A, a metal material is deposited over the entire surface of the first substrate 100. The metal material is then selectively removed to form the gate lines 101 arranged in one direction, the common lines 104a arranged in a direction parallel to the gate lines 101 while being uniformly spaced apart from the gate lines 101, and the common electrodes 104 branched from the respective common lines 104a. The gate electrodes 101a protrude from certain portions of the respective gate lines 101.

Then, the gate insulation layer 105 is formed over the entire surface of the first substrate 100 including the gate electrodes 101a, gate lines 101, common lines 104a, and common electrodes 104.

Thereafter, the semiconductor layer 107 and the metal layer 112 are deposited in sequence over the entire surface of the first substrate 100 including the gate insulation layer 105. Although not shown, the semiconductor layer 107 has a laminated structure including an amorphous silicon layer and an impurity layer formed on the amorphous silicon layer.

Figure 10B:
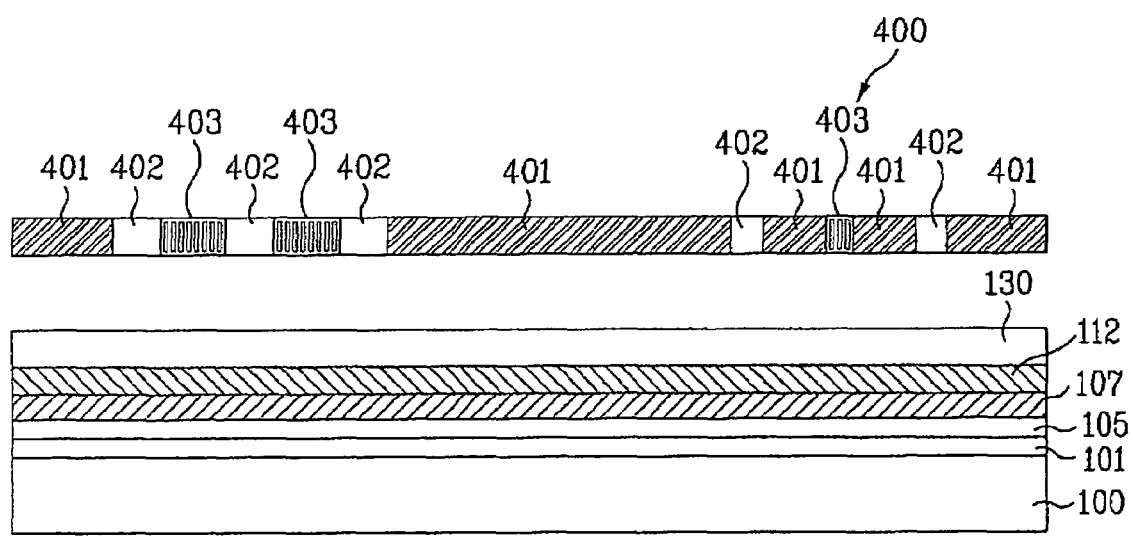

As shown in FIG. 10B, a mask 400, which is defined with light shielding portions 401, semi-transparent portions 403, and transparent portions 402, is prepared.

After coating a negative photosensitive layer 130 over the entire surface of the metal layer 112, the mask 400 is aligned on a top of the first substrate 100 including the coated photosensitive layer 130.

Here, the light shielding portions 401 of the mask 400 correspond to the regions where the metal layer 112 and semiconductor layer 107 will be completely removed after a patterning process, the transparent portions 402 correspond to the regions where the metal layer 112 and semiconductor layer 107 will remain after the patterning process, and the semi-transparent portions 403 correspond to the regions where only the semiconductor layer 107 will remain after the patterning process.

The photosensitive layer 130 is then primarily exposed and developed by use of the mask 400, to form a first photosensitive layer pattern 130a.

After completing the exposure and development processes, the regions of the first photosensitive layer pattern 130a corresponding to the transparent portions 402 and the semi-transparent portions 403 of the mask 400 remain. Specifically, the regions of the first photosensitive layer pattern 130a corresponding to the semi-transparent portions 403 are further removed to have a thickness thinner than that of the remaining regions of the first photosensitive layer pattern 130a corresponding to the transparent portions 402. As a result, the first photosensitive layer pattern 130a has a stepped structure rather than a flat structure.

Figure 10C:
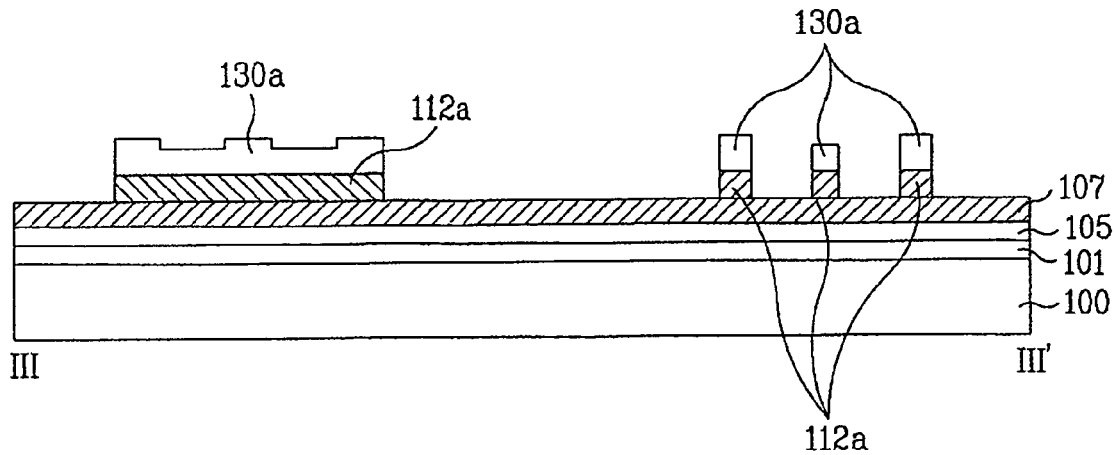

Next, the metal layer 112 is patterned by use of the first photosensitive layer pattern 130a and an etching solution or gas that is capable of selectively etching the metal layer 112, to form a metal layer pattern 112a (see FIG. 10C).

Figure 10D:
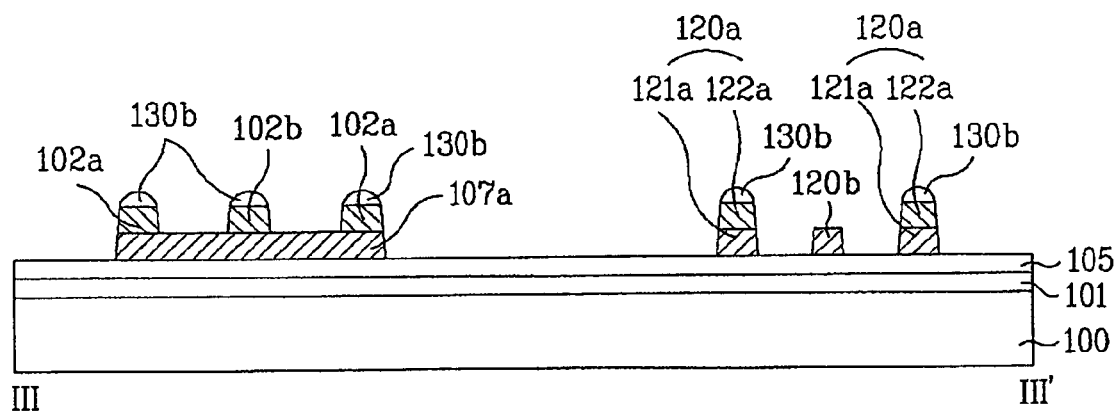

Subsequently, as shown in FIG. 10D, the semiconductor layer 107 is etched by use of the first photosensitive layer pattern 130a and an etching solution or gas that is capable of selectively etching the semiconductor layer 107, to form the semiconductor layer 107a of each thin film transistor (TFT), and to form the semiconductor layer pattern 121a of the first pattern 120a and the semiconductor layer pattern 120b of each protrusion 120. Here, the semiconductor layer pattern 121a of the first pattern 120a is a portion corresponding to an outer periphery of the protrusion 120, and the semiconductor layer pattern 120b is a portion corresponding to the center of the protrusion 120.

Thereafter, an ashing process is performed to completely remove the thinner portion of the stepped first photosensitive layer pattern 130a, to form a second photosensitive layer pattern 130b.

Then, the source/drain electrodes 102a and 102b and the source/drain metal layer pattern 122a that constitute the first pattern 120a of each protrusion 120 are formed by use of the second photosensitive layer pattern 130b and an etching solution or gas that is capable of selectively etching a metal layer.

Assuming that the semiconductor layer 107 (see FIG. 10A) has a laminated structure including the amorphous silicon layer and the n+ layer (impurity layer) formed on the amorphous silicon layer, the impurity layer in the channel region is removed by using the source/drain metal layer pattern 122a as an etching mask and by use of an etching solution or gas that is capable of selectively removing the impurity layer.

During the patterning of the semiconductor layer 107, semiconductor layer patterns 121a and 120b, and source/drain electrodes 102a and 102b as described above with reference to FIGS. 10C and 10D, the data lines 102 are further patterned to extend in a direction perpendicular to the gate lines 101. In this case, the source electrodes 102a are formed to protrude from the data lines 102.

Thereafter, the second photosensitive layer pattern 130b is removed.

Figure 10E:
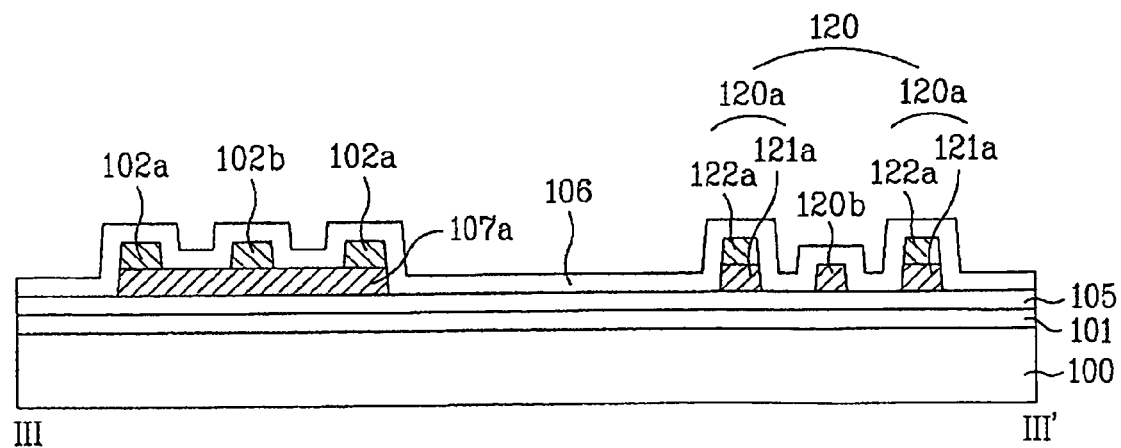

As shown in FIG. 10E, the protective layer 106 is formed over the entire surface of the first substrate 100 including the semiconductor layer 107a, source/drain electrodes 102a and 102b, and protrusion 120.

Here, the shapes of the transparent portion and light shielding portion of the mask 400 are determined depending on whether the photosensitive layer has a negative photosensitivity or positive photosensitivity. The accompanying drawings illustrate the case wherein the photosensitive layer 130 has a negative photosensitivity. If the photosensitive layer 130 has a positive photosensitivity, the shapes of the transparent portion and light shielding portion of the mask 400 are reversed, but the same patterning effect can be achieved in both the cases.

Although not shown, the protective layer 106 is selectively removed at positions above the respective drain electrodes 102b, to form the contact holes 106a.

Subsequently, a transparent electrode material is deposited over the entire surface of the protective layer 106 including the contact holes 106a. The transparent electrode material is then selectively removed, to form the pixel electrodes 103 arranged alternately with the common electrodes 104.

Thereafter, the black matrix layer 201 is formed on the second substrate 200 at portions corresponding to the regions other than the pixel regions, and the color filter layer 202 is formed on the black matrix layer 201 at portions corresponding to the pixel regions. The overcoat layer 203 is formed over the entire surface of the second substrate 200 including the black matrix layer 201 and color filter layer 202.

Subsequently, a liquid crystal material (not shown) is deposited onto the first substrate 100 or second substrate 200, and the remaining substrate 200 or 100, on which no liquid crystal material is deposited, is turned over, to bond the first and second substrates 100 and 200 each other.

The above embodiments of the present invention takes an in-plane switching (IPS) mode as an example, but the present invention is also applicable to a twist nematic (TN) mode. The twist nematic mode is similar to the above described IPS mode except for that a pixel electrode on each pixel region of a first substrate has a single pattern, and a common electrode is formed over the entire surface of a second substrate. In the case of the twist nematic mode, no common line is formed at the pixel regions, and therefore, all of first and second column spacers and protrusion are formed on gate lines.

As apparent from the above description, the liquid crystal display device and the method for manufacturing the same have advantages as follows:

First, instead of forming a protrusion to correspond to the center of a column spacer, a protrusion may be configured to correspond to the entire column spacer and may have a stepped structure due to a recess formed therein. With this configuration, only an outer periphery of the protrusion comes into contact with the column spacer when first and second substrates are bonded to each other. This reduces a contact area between the first and second substrates (more particularly, a contact area between the protrusion and the column spacer), thereby allowing rapid restoration to the original state even if a touch occurs, as compared to a conventional column spacer that wholly comes into contact with a substrate. As a result, the risk of a touch defect is significantly reduced.

Second, when the illustrated liquid crystal display device is subjected to a push test wherein a pressure, which is higher than a pressure applied for the bonding of both the substrates, is applied, the column spacer, which initially comes into contact with only the outer periphery of the protrusion when the substrates are bonded to each other, provides a gradually increased contact area to the protrusion due to the stepped structure of the protrusion. Specifically, as the pressure applied during the push test increases, the column spacer gradually comes into contact with the protrusion from a relatively shallow portion to a relatively deep portion of the recess formed in the protrusion. This can distribute the applied pressure upon the push test. As a result, the plastic deformation at the column spacer where the pressure is concentrated is alleviated, resulting in prevention of a imprinting spot.

Third, when the liquid crystals are expanded due to a high temperature, the portion of the column spacer, which is depressed by the outer periphery of the protrusion upon bonding of the substrates, acts to compensate for the expansion of the liquid crystals, thereby achieving a predetermined gravity margin, and preventing a gravity defect to some extent.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   a first substrate and a second substrate arranged to face each other;
   at least one protrusion formed on the first substrate at a first region, the at least one protrusion having a recess therein;
   a first column spacer formed on the second substrate corresponding to the at least one protrusion; and
   a liquid crystal layer filled between the first and second substrates,
   wherein the first column spacer has a surface facing the at least one protrusion, and only a peripheral portion of the surface of the first column spacer is partally in contact with the at least one protrusion.

2. The liquid crystal display device of claim 1, wherein the recess of the at least one protrusion is enclosed by the first column spacer and the at least one protrusion to form a cavity.

3. The liquid crystal display device of claim 1, wherein the at least one protrusion includes:
   a first structure surrounding the recess; and
   a second structure formed inside the recess.

4. The liquid crystal display device of claim 3, wherein the first structure extends along an entire outer periphery of the recess.

5. The liquid crystal display device of claim 3, wherein the first structure is in contact with the first column spacer, and the second structure is spaced apart from the first column spacer.

6. The liquid crystal display device of claim 5, wherein the first column spacer has a surface facing the at least one protrusion, and only a peripheral portion of the surface of the first column spacer is in contact with the first structure.

7. The liquid crystal display device of claim 3, wherein the first and second structures have different heights from each other.

8. The liquid crystal display device of claim 7, wherein the first structure is higher than the second structure.

9. The liquid crystal display device of claim 1, further comprising a second column spacer formed on the second substrate corresponding to a second region on the first substrate where the at least one protrusion is not formed, wherein the second column spacer is spaced apart from a protective layer on the first substrate.

10. The liquid crystal display device of claim 1, wherein the recess has a closed loop.

11. The liquid crystal display device of claim 10, wherein die closed loop has a circular shape or a polygonal shape.

12. The liquid crystal display device of claim 1, further comprising:
   gate lines and data lines formed on the first substrate to intersect each other and define pixel regions; and
   thin film transistors formed at intersections of the gate lines and data lines, each of the thin film transistors includes:
   a gate electrode;
   a source electrode;
   a drain electrode; and
   a semiconductor layer formed on the gate electrode to be partially overlapped with the source/drain electrodes.

13. The liquid crystal display device of claim 11, wherein the at least one protrusion has a double layered structure including a semiconductor layer pattern that is in a same layer as the semiconductor layer, and a metal layer formed above the semiconductor layer pattern, the metal layer being in a same layer as the source/drain electrodes.

14. The liquid crystal display device of claim 13, wherein the at least one protrusion further includes a protective layer directly above the double layered structure, the first column spacer being in contact with the protective layer directly above the double layered structure.

15. The liquid crystal display device of claim 13, wherein the recess of the protrusion is defined by a removed portion of the source/drain metal layer.

16. The liquid crystal display device of claim 13, wherein the recess of the protrusion is defined by a removed portion of the source/drain metal layer and a removed portion of the semiconductor layer pattern below the source/drain metal layer.

17. The liquid crystal display device of claim 12, wherein pixel electrodes are arranged alternately with common electrodes at the pixel regions of the first substrate.

18. The liquid crystal display device of claim 12, wherein pixel electrodes are formed at the pixel regions of the first substrate, and common electrodes are formed on the entire surface of the second substrate.

19. The liquid crystal display device of claim 1, wherein the first region is directly above one of gate lines on the first substrates or above one of common lines on the first substrates.

20. A method for manufacturing a liquid crystal display device comprising:
   preparing a first substrate and a second substrate facing each other;
   forming at least one protrusion on the first substrate at a first region, the at least one protrusion having a recess therein;
   forming a first column spacer on the second substrate corresponding to the at least one protrusion;
   providing liquid crystal materials between the first and second substrates; and
   bonding the first and second substrates to each other,
   wherein the bonding step includes contacting the first column spacer with the at least one protrusion, and
   wherein the first column spacer has a surface facing the at least one protrusion, and the contacting step includes partially contacting only a peripheral portion of the surface of the first column spacer with the at least one protrusion.

21. The method of claim 20, wherein the contacting step further includes enclosing the recess of the at least one protrusion by the first column spacer and the at least one protrusion to form a cavity.

22. The method of claim 20, wherein the step of forming the at least one protrusion includes:
   forming a first structure surrounding the recess; and
   forming a second structure inside the recess.

23. The method of claim 22, wherein the step of forming the first structure includes forming the first structure to extend along an entire outer periphery of the recess.

24. The method of claim 23, wherein the contacting step includes contacting the first structure with the first column spacer without contacting the second structure with the first column spacer.

25. The method of claim 24, wherein the first column spacer has a surface facing the at least one protrusion, and the contacting step further includes contacting only a peripheral portion of the surface of the first column spacer with the first structure.

26. The method of claim 22, wherein the step of forming the at least one protrusion includes forming the first and second structures to have different heights from each other.

27. The method of claim 26, wherein the first structure is higher than the second structure.

28. The method of claim 20, further comprising forming a second column spacer on the second substrate corresponding to a second region on the first substrate where the at least one protrusion is not formed, wherein the bonding step includes keeping the second column spacer spaced apart from a protective layer on the first substrate.

29. The method of claim 20, wherein the recess has a closed loop.

30. The method of claim 29, wherein the closed loop has a circular shape or a polygonal shape.

31. The method of claim 20, further comprising:
   forming gate lines on the first substrate to extend in one direction;

forming a semiconductor layer and metal layer over the entire surface of the first substrate including the gate lines; and wherein the step of forming the at least one protrusion includes selectively removing the metal layer and the semiconductor layer.

32. The method of claim 31, wherein the step of forming the at least protrusion includes forming a double layered structure including a semiconductor layer pattern that is in a same layer as the semiconductor layer, and a metal layer laminated above the semiconductor layer pattern, the metal layer being in a same layer as the source/drain electrodes.

33. The method of claim 32, wherein the step of forming the at least one protrusion further includes forming a protective layer directly above the double layered structure, and the bonding step includes contacting the first column spacer with the protective layer directly above the double layered structure.

34. The method of claim 32, wherein the recess of the protrusion is defined by removing a portion of the source/drain metal layer.

35. The method of claim 32, wherein the recess of the protrusion is defined by removing a portion of the source/drain, metal layer and a portion of the semiconductor layer pattern below the source/drain metal layer.

36. The method of claim 31, wherein the step of forming the at least one protrusion includes:

coating a photosensitive layer having a predetermined thickness over the entire surface of the metal layer;

forming a first photosensitive layer pattern having a stepped upper surface by aligning a mask above the photosensitive layer, and selectively exposing and developing certain portions of the photosensitive layer by use of the mask;

forming a metal layer pattern and semiconductor layer pattern by subsequently removing portions of the metal layer and semiconductor layer where the first photosensitive layer does not exist by using the first photosensitive layer pattern as an etching mask;

forming a second photosensitive layer pattern by removing a thinner portion of the first photosensitive layer pattern via an ashing process; and etching an exposed portion of the metal layer pattern by use of the second photosensitive layer pattern.

37. The method of claim 20, wherein the first region is directly above one of gate lines on the first substrates or one of common lines on the first substrates.

38. A spacer structure of a display device, the display device having a first substrate and a second substrate facing each other, the spacer structure comprising:

at least one protrusion formed on the first substrate at a first region, the at least one protrusion having a recess therein; and a first column spacer formed on the second substrate corresponding to the at least one protrusions, wherein the first column spacer has a surface facing the at least one protrusion, and only a peripheral portion of the surface of the first column spacer is partially in contact with the at least one protrusion.

39. The spacer structure of claim 38, further comprising a second column spacer formed on the second substrate corresponding to a second region on the first substrate where the at least one protrusion is not formed, wherein the second column spacer is spaced apart from a protective layer on the first substrate.

* * * * *